United States Patent
Dhayapule et al.

(10) Patent No.: US 10,353,913 B2
(45) Date of Patent: *Jul. 16, 2019

(54) AUTOMATING EXTRACT, TRANSFORM, AND LOAD JOB TESTING

(71) Applicant: International Business Machines Corporation, Armonk, NY (US)

(72) Inventors: Raghavendra R. Dhayapule, Bangalore (IN); Ritesh K. Gupta, Hyderabad (IN); Sumit Kumar, Bangalore (IN); Rajesh Phillips, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/008,127

(22) Filed: Jun. 14, 2018

(65) Prior Publication Data

US 2018/0293287 A1 Oct. 11, 2018

Related U.S. Application Data

(63) Continuation of application No. 14/843,425, filed on Sep. 2, 2015, now Pat. No. 10,042,903.

(51) Int. Cl.
G06F 17/30 (2006.01)
G06F 16/25 (2019.01)

(52) U.S. Cl.
CPC .................. *G06F 16/254* (2019.01)

(58) Field of Classification Search
USPC ............... 707/602, 687, 705, 790, 821, 964
See application file for complete search history.

(56) References Cited

U.S. PATENT DOCUMENTS

| 2015/0020049 | A1 | 1/2015 | Caufield et al. |
| 2015/0046389 | A1 | 2/2015 | Dhayapule et al. |
| 2015/0347261 | A1* | 12/2015 | Li ......................... G06F 16/254 707/602 |
| 2017/0032016 | A1* | 2/2017 | Zinner .................. G06Q 10/063 |
| 2017/0060968 | A1* | 3/2017 | Dhayapule ............ G06F 11/368 |

(Continued)

OTHER PUBLICATIONS

DTM, "Test Data Generator Overview," DTM Data Generator, p. 1-2, DTM soft, http://www.sqledit.com/dg/, Accessed on Jul. 7, 2015.

(Continued)

*Primary Examiner* — Sana A Al-Hashemi
(74) *Attorney, Agent, or Firm* — Kenneth Han (57) ABSTRACT

A method for testing an extract, transform, load job (ETL job) is provided. The method may include receiving an uploaded ETL job. The method may also include executing a functionality test of the uploaded ETL job using a test bucket. The method may further include determining the executed functionality test produces a failure result. The method may also include creating at least one test sub-job corresponding to at least one stage within on the uploaded ETL job. The method may further include generating a plurality of test data for each of the at least one created test sub-job. The method may also include executing the at least one created test sub-job using the plurality of generated test data. The method may further include creating a report based on a plurality of results associated with the at least one executed test sub-job.

14 Claims, 7 Drawing Sheets

(56) References Cited

U.S. PATENT DOCUMENTS

2017/0060969 A1    3/2017    Dhayapule et al.
2017/0060971 A1    3/2017    Dhayapule et al.
2017/0075967 A1*  3/2017    Dhayapule ............ G06F 16/254

OTHER PUBLICATIONS

EMS, "EMS Data Generator," SQL Manager, 2012, 2 Pages, EMS Database Management Solutions, Inc.

Kumar et al., "An Approach to Test Case Design for Cost Effective Software Testing," Proceedings of the International MultiConference of Engineers and Computer Scientists (IMECS), Mar. 18-20, 2009, 7 Pages, vol. I, Hong Kong.

Mell et al., "The NIST Definition of Cloud Computing," National Institute of Standards and Technology, Sep. 2011, p. 1-3, Special Publication 800-145.

Redgate, "SQL Data Generator," redgate Development Products, p. 1-4, Red Gate Software Ltd., http://www.red-gate.com/products/sql-development/sql-data-generator/, Accessed on Sep. 7, 2015.

Sood, "IBM InfoSphere DataStage job validation steps using IBM Optim Test Data Management Solution," IBM developerWorks, Mar. 28, 2013, p. 1-28, IBM Corporation.

Dhayapule et al., Pending U.S. Appl. No. 14/928,452, titled "Compiling Extract, Transform, and Load Job Test Data Cases", filed Mar. 22, 2018, pp. 1-33.

IBM: List of IBM Patents or Patent Applications Treated as Related (Appendix P), Oct. 12, 2018, pp. 1-2.

* cited by examiner

AUTOMATING EXTRACT, TRANSFORM, AND LOAD JOB TESTING

FIELD OF INVENTION

The present invention relates generally to the field of computing, and more particularly to extract, transform, and load (ETL) systems.

BACKGROUND

Extract, transform, load systems (ETL systems) relate to database usage and data warehousing processes that extract data from data sources, transform the extracted data for storage in a suitable querying and analysis structure or format, and loads the transformed data into a target database. ETL functions may be, typically, executed in parallel to conserve time. Furthermore, ETL systems may be capable of integrating data from multiple sources so the source data may be compiled and consumed in the target database.

SUMMARY

According to one embodiment, a method for testing an extract, transform, load job (ETL job) is provided. The method may include receiving an uploaded ETL job. The method may also include executing a functionality test of the uploaded ETL job using a test bucket. The method may further include determining the executed functionality test produces a failure result. The method may also include creating at least one test sub-job corresponding to at least one stage within on the uploaded ETL job. The method may further include generating a plurality of test data for each of the at least one created test sub-job. The method may also include executing the at least one created test sub-job using the plurality of generated test data. The method may further include creating a report based on a plurality of results associated with the at least one executed test sub-job.

According to another embodiment, a computer system for testing an extract, transform, load job (ETL job) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system may include receiving an uploaded ETL job. The computer system may also include executing a functionality test of the uploaded ETL job using a test bucket. The computer system may further include determining the executed functionality test produces a failure result. The computer system may also include creating at least one test sub-job corresponding to at least one stage within on the uploaded ETL job. The computer system may further include generating a plurality of test data for each of the at least one created test sub-job. The computer system may also include executing the at least one created test sub-job using the plurality of generated test data. The computer system may further include creating a report based on a plurality of results associated with the at least one executed test sub-job.

According to yet another embodiment, a computer program product for testing an extract, transform, load job (ETL job) is provided. The computer program product may include one or more computer-readable storage devices and program instructions stored on at least one of the one or more tangible storage devices, the program instructions executable by a processor. The computer program product may include program instructions to receive an uploaded ETL job. The computer program product may also include program instructions to execute a functionality test of the uploaded ETL job using a test bucket. The computer program product may further include program instructions to determine the executed functionality test produces a failure result. The computer program product may also include program instructions to create at least one test sub-job corresponding to at least one stage within on the uploaded ETL job. The computer program product may further include program instructions to generate a plurality of test data for each of the at least one created test sub-job. The computer program product may also include program instructions to execute the at least one created test sub-job using the plurality of generated test data. The computer program product may further include program instructions to create a report based on a plurality of results associated with the at least one executed test sub-job.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to extract, transform, load systems (i.e. ETL systems). The following described exemplary embodiments provide a system, method, and program product to, among other things, create a computer automated mechanism to test the functionality of ETL systems at the stage level. Therefore, the present embodiment has the capacity to improve the technical field of ETL systems by creating a holistic approach to testing ETL system functionality that may significantly reduce the time and resources currently required by existing ETL testing.

As previously described, ETL systems may be designed to extract data from data sources, such as indexed files, sequential files, relational databases, archives, external data sources, enterprise applications, and message queues, transform the extracted data based on preconfigured programming logic, and then load the transformed data into one or more preconfigured databases. Typically, ETL developers design ETL systems using a specific ETL tool, such as IBM® InfoSphere® DataStage® (IBM InfoSphere DataStage and all IBM InfoSphere DataStage-based trademarks and logos are trademarks or registered trademarks of International Business Machines Corporation and/or its affiliates), based on the requirements, data integration specifications, and data flows. Once an ETL job is designed, the ETL system may be compiled into binaries and executed in a production environment. The ETL system may be executed in the production environment on preconfigured periodic or scheduled intervals, such as hourly, daily, or weekly. Due to the expansive size of a typical ETL system, many ETL tools may allow for parallel processing capabilities. Many ETL tools may be capable of operating in batch, real time, or as a web service.

A core function of many ETL tools may be data transformation and data movement. Data transformation and data movement may be the process of selecting, converting, and mapping source data to a format required by the target system, or destination system. Data transformation and movement may manipulate data to ensure the data is in compliance with business, domain, and integrity rules. Data transformation may occur in various forms, such as aggregation, basic conversion, cleansing, derivation, enrichment, normalizing, combining, pivoting, and sorting.

A job, or ETL job, may refer to the series of processes that result in the extraction, transformation, and loading of data to a target system. An ETL job may consist of one or more individual stages that are linked together by the flow of data from a source to a destination, or target. Typically, each stage within a job may include one data input and one data output. However, a stage may also be capable of accepting more than one data input and more than one data output. For example, input data may be gathered from three relational databases. Similarly, output data may be sent from a transformer stage to two targets. Each stage within a job may have preconfigured properties that enable each stage to perform specified steps. The preconfigured stage properties may be viewed or edited using a stage editor. Stages may be added to a job and linked together using a stage designer. Many types of stages may exist including transformer stages, sorting stages, aggregator stages, and processing stages. Furthermore, references to and descriptions of ETL jobs may be for example purposes only. References to ETL jobs may apply to other types of jobs or processes that include multiple stages.

In order to ensure the accuracy of an ETL job, thorough testing and validation of the job may be required. ETL job testing may be categorized into four main engagements, such as new data warehouse testing, migration testing, change request, and report testing. Additionally, ETL job testing may include unit testing of ETL jobs, maximum code coverage testing of stages and stage paths, white box testing, and determination of whether each ETL job is producing expected results. Furthermore, ETL job testing may verify data is correctly transformed according to various business rules and requirements, all projected data is properly loaded into the target system, the ETL application properly rejects, replaces, and reports invalid data, and ensure data is loaded to the target system within a prescribed time frame. Additionally, an ETL tool may be utilized to add, remove, or edit stages within an existing ETL job. Once an ETL job has been changed by adding, removing, or editing stages, the ETL job may require additional ETL job testing to ensure the changes do not adversely affect the ETL job.

As the complexity of data integration tasks increases, the complexity of the ETL job may also increase. Therefore, a large amount of time may be required for testers to tediously review the ETL job processes manually to determine if an ETL job is functioning properly and, if an ETL job is not functioning properly, identify the stage of the ETL job creating the malfunction. As such, it may be advantageous, among other things, to implement a mechanism that allows for automatic review and testing of ETL jobs.

According to one embodiment, a compiled set of test data and ETL jobs (i.e. a golden test bucket, or test bucket) may be used to determine if an ETL job is producing accurate, expected results. The test bucket may be executed against an identified minimum set of ETL jobs or stages that require testing. If an ETL job produces unexpected test data results, the ETL job may be separated into sub-jobs, or joblets, on the stage level to determine which portion of the ETL job is causing the entire ETL job to fail. The test data cases may again be used to test the functionality of the ETL job but on the test joblet level. The resultant data may be displayed in a report that illustrates the whether each test joblet produced expected test data results. The report may be reviewed by a system tester and used to aid the system tester in repairing the malfunctioning ETL job. Furthermore, as previously described, references to ETL jobs may apply to other types of jobs or processes that include multiple stages.

Additionally, in the case of a product upgrade or product migration, a minimum set of jobs may be identified that must be tested due to product changes. The identified minimum set of jobs may be automatically tested before and after the product upgrade to determine if there are any differences in the results produced by the changed jobs. If a changed job returns unexpected or failed results, the job may be divided into joblets that may then individually tested to determine the location of the error.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create a mechanism capable of automatically testing the functionality of ETL jobs on the stage level. According to at least one implementation, the present embodiment may use a compiled set of test data to determine if an ETL job is producing accurate, expected results. If unexpected test data results are returned by the ETL job, each portion of the ETL job may be divided into sub-jobs, or joblets. The test data may be executed through each test joblet. A report illustrating the functionality of each test joblet may then be created and used by a system tester to determine the functionality of each test joblet.

Figure 1:
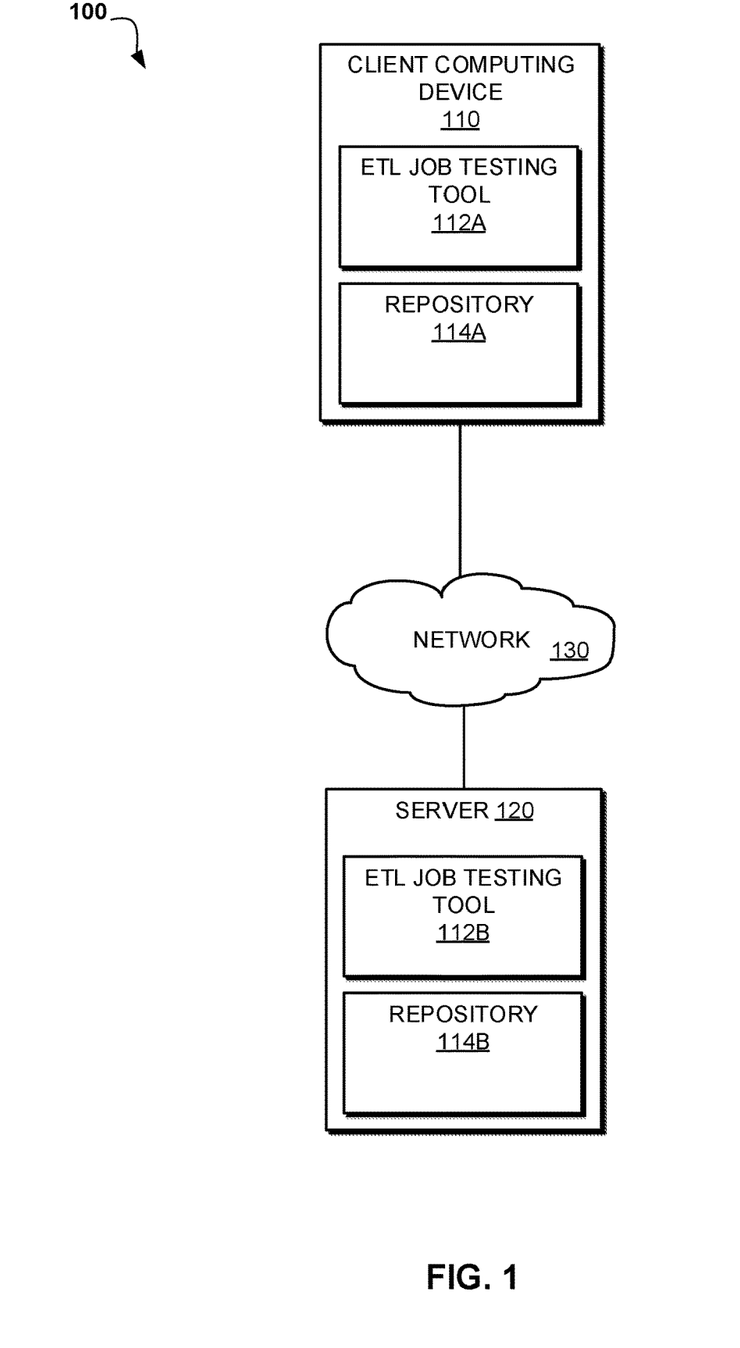
FIG. 1 is an exemplary networked computer environment, in accordance with one embodiment of the present invention.

Referring to FIG. 1, an exemplary networked computer environment 100 is depicted, in accordance with one embodiment. The networked computer environment 100 may include client computing device 110 and server 120 interconnected via communication network 130. According to at least one implementation, networked computer environment 100 may include a plurality of client computing devices 110 and server 120, only one of each being shown for illustrative brevity.

Communication network 130 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 110 may be, for example, a mobile device, a telephone, a personal digital assistant, a netbook, a laptop computer, a tablet computer, a desktop computer, or any type of computing device capable of running a program and accessing a network. Client computing device 110 may be capable of hosting ETL job testing tool 112A, 112B, repository 114A, 114B, and communicating with server 120 via network 130, in accordance with one embodiment of the invention. As will be discussed with reference to FIG. 5, client computing device 110 may include internal components 502a and external components 504a, respectively.

Server computer 120, or database server, may be a laptop computer, netbook computer, personal computer (PC), a desktop computer, or any programmable electronic device capable of hosting ETL job testing tool 112A, 112B, repository 114A, 114B, and communicating with client computing device 110 via network 130, in accordance with embodiments of the invention. As will be discussed with reference to FIG. 5, server computer 120 may include internal components 502b and external components 504b, respectively. Server 120 may also operate in a cloud computing service model, such as Software as a Service (SaaS), Platform as a Service (PaaS), or Infrastructure as a Service (IaaS). Server 120 may also be located in a cloud computing deployment model, such as a private cloud, community cloud, public cloud, or hybrid cloud.

According to the present embodiment, repository 114A, 114B may be a file or system capable of storing data. Repository 114A, 114B may include indexed files, sequential files, relational databases, archives, external data sources, enterprise applications, and message queues. Repository 114A, 114B may be the source system and the target system from which ETL job testing tool 112A, 112B gathers and loads data. The information stored within repository 114A, 114B may be capable of storing a test bucket of test case data that includes developer created test case data, test case data generated within ETL stages, and test case data captured from third party sources.

ETL job testing tool 112A, 112B may be a program capable of creating a golden test bucket and automatically testing stages of an ETL job using the created golden test bucket. ETL job testing tool 112A, 112B may be capable of gathering and loading data to and from repository 114A, 114B. ETL job testing tool 112A, 112B may be a subcomponent of an ETL tool, such as IBM® InfoSphere® DataStage®. Furthermore, ETL job testing tool 112A, 112B may be capable of identifying a minimum set of uploaded ETL jobs or stages within ETL jobs that require testing due to upgrades. Additionally, ETL job testing tool 112A, 112B may maintain a change list of all feature changes in a product release or fix release. ETL job testing tool 112A, 112B may automatically capture the change list from the source configuration management (SCM) tools based on the defects or work items committed to the SCM repository. ETL job testing tool 112A, 112B is explained in further detail below with respect to FIGS. 2 and 3.

Figure 2:
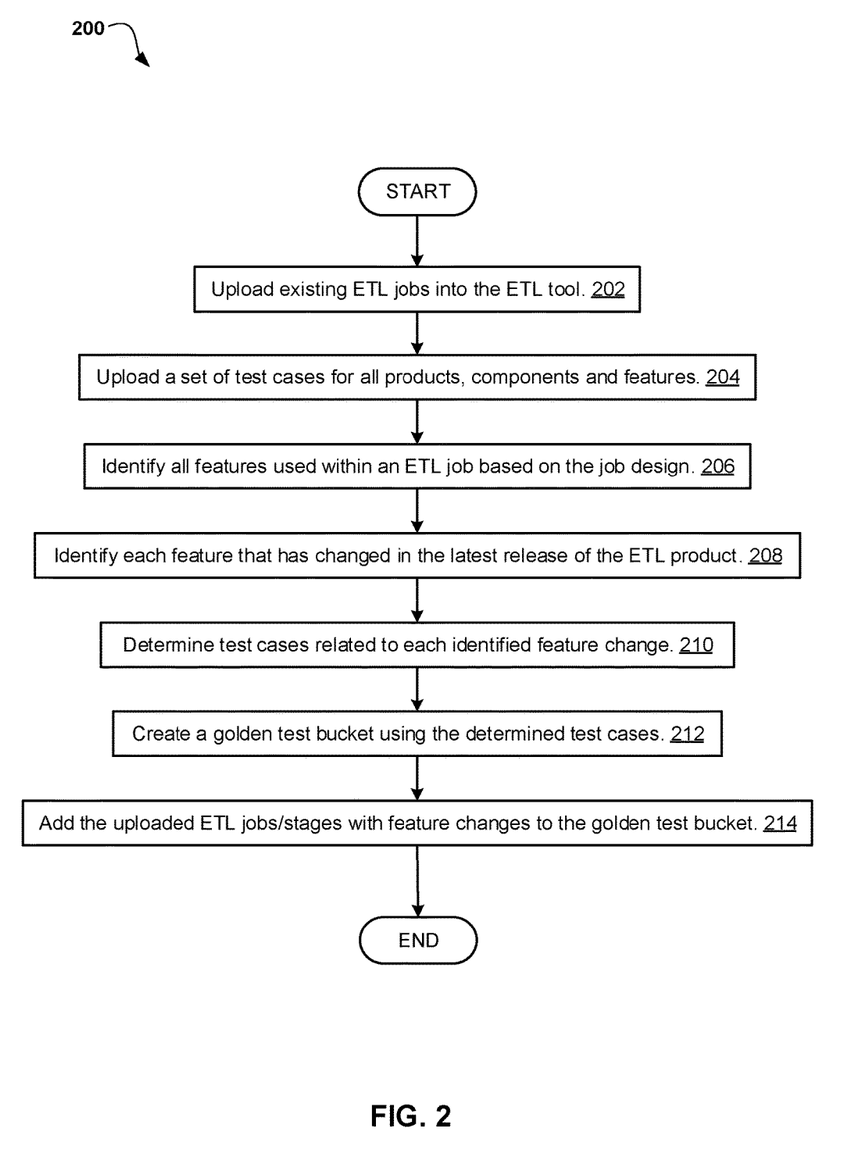
FIG. 2 illustrates a flowchart of the operational steps carried out by a program to compile and/or generate a group of test cases used to test the functionality of an ETL job, in accordance with one embodiment of the present invention.

Referring now to FIG. 2, a flowchart 200 of the operational steps carried out by a program to compile and/or generate a group of test cases used to test the functionality of an ETL job is depicted, in accordance with one embodiment of the present invention. At 202, existing ETL jobs may be uploaded to ETL job testing tool 112A, 112B. In order to begin creation of a golden test bucket of test data cases, ETL jobs may be uploaded to ETL job testing tool 112A, 112B. For example, a time transformation ETL job may be designed to extract time information represented in Indian Standard Time (IST) from one database, such as repository 114B, transform the received time information to Eastern Daylight Time (EDT), and load the transformed time information to a second database, such as repository 114A. If a user wishes to test the functionality of the time transformation ETL job using a golden test bucket of test data cases, the user may upload to time transformation ETL job to ETL job testing tool 112A, 112B. Furthermore, the ETL jobs uploaded by the user may include multiple versions of the same ETL job, such as a latest release version and a second latest release version of the ETL job.

Next at 204, test cases for all user products, components, and features may be uploaded to ETL job testing tool 112A, 112B. ETL job testing tool 112A, 112B may support uploading of test cases created by program developers and stored within each stage of an ETL job or test cases created by capturing input/output data of actual ETL processes. The test cases may be used to test the functionality of each product, component, and feature within the uploaded ETL job. Test case data may be used as input data within an ETL job or a stage within an ETL job and specific output data may be expected based on the input test case data. Additionally, the test cases may be stored within a repository, such as repository 114A, 114B.

Then at 206, ETL job testing tool 112A, 112B may identify features used within an ETL job based on the job design. As previously described, an ETL job may consist of one or more individual stages that are linked together by the flow of data from a source to a destination, or target. Typically, each stage within a job may include one data input and one data output. However, a stage may also be capable of accepting more than one data input and more than one data output. ETL job testing tool 112A, 112B may parse through the uploaded ETL job to identify stage features, such as stage type, type of input data, type of output data, number of inputs, number of outputs, input source, output destination, and stage processing methods. Additionally, once all features used in the ETL job have been identified, ETL job testing tool 112A, 112B may generate a database, such as repository 114A, 114B, of all identified features based on the ETL job design.

ETL job testing tool 112A, 112B may collect various feature information to include within repository 114A, 114B based on the characteristics of each stage within the uploaded ETL job. For example, if the stage is an input/output stage, ETL job testing tool 112A, 112B may collect the stage type, such as DB2, Teradata, or sequential file. If the stage is a processing stage, ETL job testing tool 112A, 112B may read the business logic of the stage, collect all methods used by the processing stage, and generate ETL job test cases based on the read business logic.

When identifying features within uploaded ETL jobs, ETL job testing tool 112A, 112B may determine an uploaded ETL job includes a custom stage. Many ETL design programs, such as IBM® InfoSphere® DataStage®, may be capable of creating custom stages according to user preferences. Since custom stages built according to user preferences may not have developer created test data cases, ETL job testing tool 112A, 112B may dynamically generate test cases or capture data from custom stages when the custom stages are identified during the feature identification process. For example, when ETL job testing tool 112A, 112B identifies a stage in an uploaded ETL job as a custom built stage or operator, ETL job testing tool 112A, 112B may generate ETL job test cases capable of being processed by the custom stage or operator. The generated ETL job test cases for the custom built stage may be included with the uploaded set of test cases uploaded to ETL job testing tool 112A, 112B in step 204.

Next at 208, ETL job testing tool 112A, 112B may identify each feature that has changed in the latest release of the ETL product to be upgraded. For each identified feature on the generated list of features used in the uploaded ETL job, ETL job testing tool 112A, 112B may determine whether each identified feature that has changed in the latest release of the ETL job based on a change list or package file component. In order to allow for efficient testing of each uploaded ETL job since not all features may require testing, ETL job testing tool 112A, 112B may only test the identified features that have changed in the most recent release of the uploaded ETL jobs. For example, if a three stage ETL job is uploaded to ETL job testing tool 112A, 112B that only has a change to stage two in the most recent release, then ETL job testing tool 112A, 112B may omit testing of stage one and stage three since no change to those two stages has occurred and testing of stage one and stage three may not be necessary. Furthermore, when an ETL job is uploaded to ETL job testing tool 112A, 112B that does not have a previous release, such as when the uploaded ETL job is a first release of the ETL job, then all ETL job features may be identified for testing since none of the features within the uploaded ETL job may have been previously tested. Additionally, if an uploaded ETL job has multiple previous releases, ETL job testing tool 112A, 112B may be capable of identifying feature changes made between any previous release and the latest release. For example, the latest release of an uploaded ETL job is the fourth release of the ETL job and testing of the uploaded ETL job has not occurred since the first release of the ETL job, ETL job testing tool 112A, 112B may be capable of identifying feature changes between the fourth release and the first release. Furthermore, ETL job testing tool 112A, 112B may be capable of testing specific stages of the uploaded ETL job based on user preferences. For example, a user wishes to only test the processing stage of an ETL job but omit testing of a sequential stage of the same ETL job.

In another embodiment of the present invention, ETL job testing tool 112A, 112B may be capable of identifying the features of the uploaded ETL job that a user utilizes the most. For example, if a three stage ETL job containing a processing stage, a sequential stage, and a DB2 stage is uploaded to ETL job testing tool 112A, 112B, ETL job testing tool 112A, 112B may be capable of identifying that the sequential stage is rarely used. Therefore, ETL job testing tool 112A, 112B may limit testing of the sequential stage when the uploaded ETL job is tested in order to conserve time and resources through the test process.

Then at 210, ETL job testing tool 112A, 112B may determine test cases related to each identified feature change. Once the changed features in the latest release of the uploaded ETL job have been identified, ETL job testing tool 112A, 112B may determine the test cases within the uploaded set of test cases to execute against the identified feature changes. The test cases may be selected from the set of test cases based on the relatedness of each test case to the identified feature change. For example, in the previously discussed example of a time transformation ETL job where time information represented in Indian Standard Time (IST) is extracted from one database, transformed to Eastern Daylight Time (EDT), and loaded to a second database, ETL job testing tool 112A, 112B may analyze the uploaded test cases to determine one or more test cases that relate to transforming time information from one time zone to another time zone, if that feature is the only feature change within the time transformation ETL job.

Next at 212, ETL job testing tool 112A, 112B may create a golden test bucket by grouping the determined test cases together. ETL job testing tool 112A, 112B may use the determined test cases to test the functionality of the uploaded ETL jobs or stages within the uploaded ETL jobs containing feature changes. Therefore, ETL job testing tool 112A, 112B may group all of the determined test cases together to create a golden test bucket of test data for the uploaded ETL jobs and stages. For example, in a three stage ETL job that includes a sequencing stage, a transformation stage and a DB2 stage, only the sequencing stage and the transformation stage may include feature changes. Therefore, ETL job testing tool 112A, 112B may group the determined test cases associated with the sequencing stage and the transformation stage together to create the golden test bucket. Additionally, ETL job testing tool 112A, 112B may store the golden test bucket of test data cases on repository 114A, 114B.

Next at 214, ETL job testing tool 112A, 112B may add the uploaded ETL jobs or stages that contain feature changes to the golden test bucket. In order to ensure the test cases within the golden test bucket are tested against the appropriate uploaded ETL jobs and stages, ETL job testing tool 112A, 112B may add the uploaded ETL jobs and stages containing feature changes to the golden test bucket by grouping the uploaded ETL job and stages together with the determined test cases.

Figure 3:
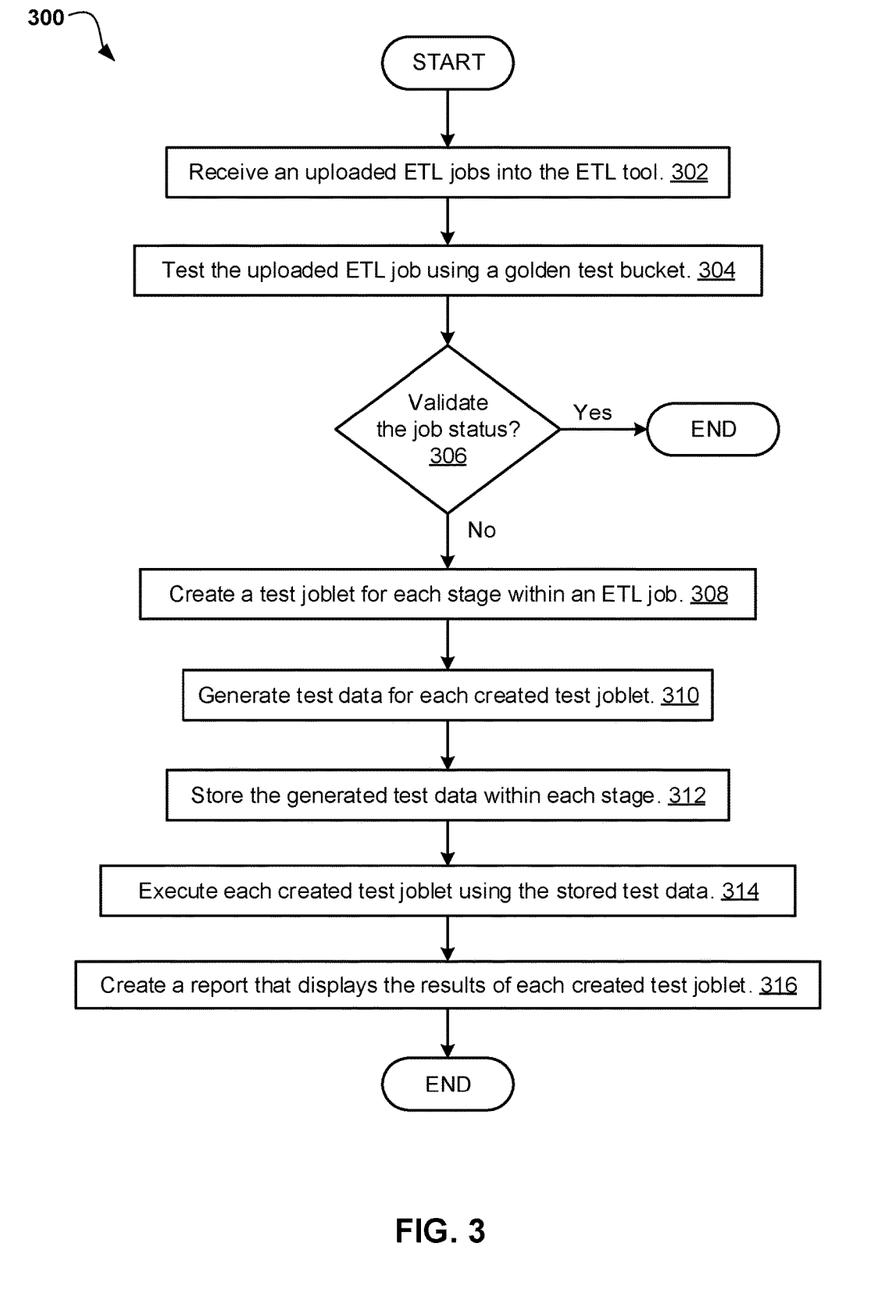
FIG. 3 illustrates a flowchart of the operational steps carried out by a program to test ETL jobs at the stage level, in accordance with one embodiment of the present invention.

Referring now to FIG. 3, a flowchart 300 of the operational steps carried out by a program to test ETL jobs at the stage level is depicted, in accordance with one embodiment of the present invention. At 302, ETL job testing tool 112A, 112B may receive an uploaded ETL job in need of testing. In order to begin testing an ETL job, the uploaded ETL job may be received by ETL job testing tool 112A, 112B. For example, a time transformation ETL job may be designed to extract time information represented in Indian Standard Time (IST) from one database, such as repository 114B, transform the received time information to Eastern Daylight Time (EDT), and load the transformed time information to a second database, such as repository 114A. If a user wishes to test the functionality of the time transformation ETL job, the user may upload to time transformation ETL job to ETL job testing tool 112A, 112B. Furthermore, the ETL job uploaded by the user may include multiple versions of the same ETL job, such as a latest release version and a second latest release version of the ETL job.

Next at 304, ETL job testing tool 112A, 112B may conduct a functionality test of the uploaded ETL job using a compiled set of test data cases, or test bucket. The test bucket may be a compilation of test data cases corresponding to feature changes within the uploaded ETL job. Therefore, ETL job testing tool 112A, 112B may use the test bucket to test the functionality of each feature change within the latest release of the ETL job from a previous release of the ETL job. Furthermore, the test bucket may be created by or uploaded to ETL job testing tool 112A, 112B.

Then at 306, ETL job testing tool 112A, 112B may determine if the uploaded ETL job should be validated. According to one implementation, the method may continue along operational flowchart 300, if the ETL job testing tool 112A, 112B does not validate the uploaded ETL job. If ETL job testing tool 112A, 112B validates the uploaded ETL job (step 306, "YES" branch), ETL job testing tool 112A, 112B may determine the uploaded ETL job passes the testing stage and the method may terminate. If ETL job testing tool 112A, 112B does not validate the uploaded ETL job, (step 306, "NO" branch), ETL job testing tool 112A, 112B may continue to step 308 to create a test joblet for each stage of the uploaded ETL job.

ETL job testing tool 112A, 112B may validate the ETL job by analyzing the functionality test results returned when the uploaded ETL job was tested using the test bucket. By analyzing output data when testing the functionality of the ETL job using the test bucket, ETL job testing tool 112A, 112B may determine if the ETL job should be validated. If output data of the uploaded ETL job, such as job status and other preconfigured criteria, such as row count and number of warnings, is the same for both the latest release and the previous latest release, then ETL job testing tool 112A, 112B may validate the ETL job. Conversely, if the output data of the uploaded ETL job is not the same for both the latest release and the previous latest release, then ETL job testing tool 112A, 112B may not validate the ETL job.

Next at 308, ETL job testing tool 112A, 112B may create a test joblet, or sub-job, for each stage within an ETL job. When ETL job testing tool 112A, 112B does not validate an uploaded ETL job, ETL job testing tool 112A, 112B may divide the uploaded ETL job into joblets. A joblet may be a portion of the uploaded ETL job. For example, if a three stage ETL job that includes a sequencing stage, a transformation stage, and a DB2 stage fails to be validated, ETL job testing tool 112A, 112B may not be able to determine which of the three stages has failed and caused the uploaded ETL job to not be validated. In order to determine which of the stages has failed, ETL job testing tool 112A, 112B may create joblets by dividing the ETL job. A joblet may be created by separating or dividing the ETL job into separate stages, sub-stages, or stage functions. For example, joblets into the previous example may be a sequencing stage joblet, a transformation stage joblet, and a DB2 stage joblet.

ETL job testing tool 112A, 112B may create joblets using a TestData stage. The TestData stage may be a test stage that is capable of processing test data from a repository, such as repository 114A, 114B. The TestData stage may be an input stage or an output stage that holds the original stage data as well as the test case data for the schema. When used as an input stage, the TestData stage may act as a producer of data that feeds data to a subsequent stage. When used as an output stage, the TestData stage may act as a consumer of data sent by the previous stage. Furthermore, the TestData stage may be developed as an operator using standard stage creation frameworks and by encapsulating the original stage. Additionally, the TestData stage may be used to connect the individual joblets that arise after dividing the original uploaded ETL job.

When creating joblets for each stage of an uploaded ETL job, ETL job testing tool 112A, 112B may traverse the uploaded ETL job and analyze each stage of the job. Each stage of the uploaded ETL job may be handled depending on the type of stage. For example, if the stage is an input or output stage, ETL job testing tool 112A, 112B may generate a TestData stage by encapsulating the input/output stage and create a test joblet by replacing the stage with the TestData stage. Similarly, for processing stages, ETL job testing tool 112A, 112B may read the schema of each input and output stage for the processing stage, create TestData stages for each schema, generate TestData stages as needed for all distinct methods as determined after reading the processing stage logic, and generate the joblets by replacing the processing stage with the TestData stage. For processing stages, ETL job testing tool 112A, 112B may create as many test joblets as the number of input and output links for the processing stage.

According to another embodiment, the feature of testing ETL jobs by dividing the ETL job into test joblets may be integrated within the user interface of ETL job testing tool 112A, 112B. Facility may be provided to enable or disable the integrated feature. When a new ETL job is designed in the user interface with the test feature enabled, the test joblets may be automatically created and stored in repository 114A, 114B when the job is saved. Furthermore, when an ETL job is changed by adding a new stage or modifying any existing stage, the test joblets may be updated accordingly. For example, when a new stage is added to an existing ETL job, one or more new test joblets may be created and stored in the test repository and, when any existing stage is modified, corresponding test joblets may be retrieved and updated accordingly for the changed stage and job design. Updating or adding new joblets may be achieved automatically when saving the ETL job to improve the performance of the save operation. Additionally, analysis may be implemented only on the updated portion of the ETL job. The updated portion may be identified by comparing the existing or saved job design from the design repository with the updated job design in memory. Once created, the test joblets may be used for testing during the lifecycle of the ETL job development and for continuous testing thereafter. When the ETL job is executed, the test data for each joblet may be populated and may be set as a baseline to compare against for any future runs of the job. Facility may be provided to store, view, or update the test data for each stage and the corresponding joblets in repository 114A, 114B.

Then at 310, ETL job testing tool 112A, 112B may generate test data for each created test joblet. ETL job testing tool 112A, 112B may generate the test data based on the type of TestData stage. For example, if the TestData stage is an input stage, ETL job testing tool 112A, 112B may read the encapsulated stage schema to generate the test data. Similarly, if the TestData stage is an output stage, ETL job testing tool 112A, 112B may read the schema received from a connected input stage. ETL job testing tool 112A, 112B may generate all possible data tuples based on the data types, length, scale, and nullability of the schema. Additionally, ETL job testing tool 112A, 112B may generate both positive and negative test cases. Furthermore, once a schema is identified from a test joblet, ETL job testing tool 112A, 112B may use an existing data generation technique, such as SQL Data Generator® (SQL Data Generator and all SQL Data Generator-based trademarks and logos are trademarks or registered trademarks of Red Gate Software Ltd and/or its affiliates), to generate the test data.

Next at 312, ETL job testing tool 112A, 112B may store the generated test data within each stage. Similarly, ETL job testing tool 112A, 112B may store the generated test data within a repository, such as repository 114A, 114B.

Then at 314, ETL job testing tool 112A, 112B may execute each created test joblet using the stored test data. Once ETL job testing tool 112A, 112B generates and stores the test data, ETL job testing tool 112A, 112B may utilize a runtime framework to read the test data for each tuple of input data. ETL job testing tool may then set up the input data based on the stage type of each TestData stage. For example, if the stage type is a sequential file, ETL job testing tool may create the test file with the input data. Similarly, if the stage type is DB2, ETL job testing tool may read the DB2 stage properties, create a table in the DB2 machine, and populate the table with the test data. Furthermore, ETL job testing tool 112A, 112B may also validate the job status of each stage. For example, if the test data returns a positive result, then ETL job testing tool 112A, 112B may validate the stage job status. Conversely, if the test data returns a negative result, then ETL job testing tool 112A, 112B may not validate the stage job status.

In order to identify the stage level issues more precisely, the actual customer data may also be captured at each point (i.e., the input data to the stage and the output data from the stage) of the ETL job and may be stored in the test repository for the corresponding stage of the ETL job. Furthermore, the data may be captured by dumping the data sets at each stage. During the stage level testing, the captured input data may be read by the TestData stage of the joblet as input for the stage and, after joblet execution, the output data of the stage may be compared with the captured output data.

Next at 316, ETL job testing tool 112A, 112B may create a report that displays the results of each created test joblet. The created report may display the test results reported by each test joblet. For example, if a test joblet was validated by ETL job testing tool 112A, 112B, ETL job testing tool 112A, 112B may indicate the validation of the test joblet with the text, "Success" on the created report. If a test joblet was not validated by ETL job testing tool 112A, 112B, ETL job testing tool 112A, 112B may indicate the failure of the test joblet with the text, "Failure" on the created report.

Figure 4:
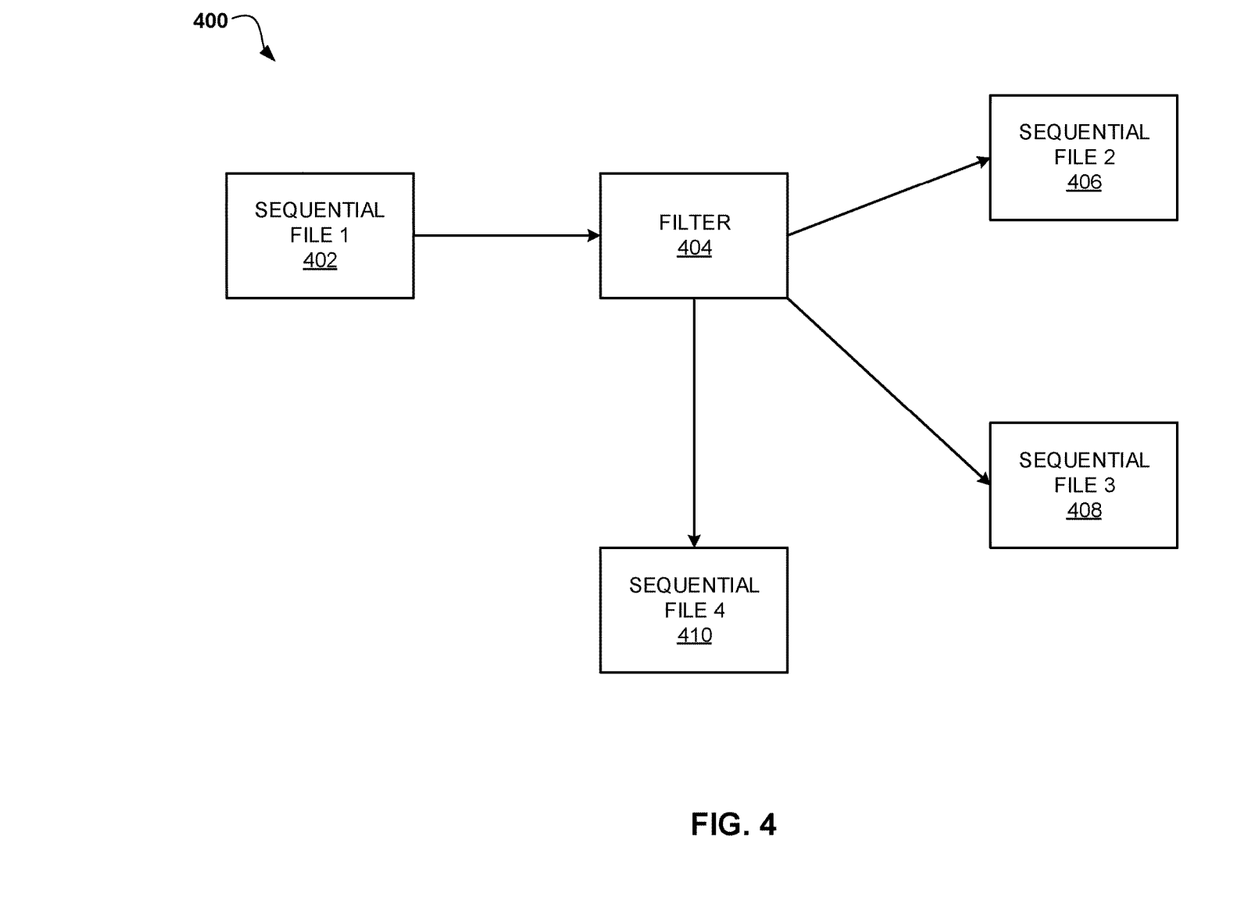
FIG. 4 is a functional block diagram of the steps implemented by an ETL testing program, in accordance with one embodiment of the present invention.

Referring now to FIG. 4, a functional block diagram 400 of an uploaded ETL job being tested by an ETL job testing tool is depicted, in accordance with one embodiment of the present invention. The uploaded three-stage ETL job contains sequential file 1 402 transmitting data to filter 404. The data transmitted from sequential file 1 402 to filter 404 may be employee data, such as employee name tables or employee identification (ID) number tables. Filter 404 may separate the employee data based on user preconfigured selections, such as geographic location. Filter 404 may then transmit the separated employee data to sequential file 2 406, sequential file 3 408, and sequential file 4 410.

ETL job testing tool 112A, 112B may be implemented to test the functionality of the uploaded ETL job. If ETL job testing tool 112A, 112B determines the uploaded ETL job has had a feature change in the latest release, ETL job testing tool 112A, 112B may begin testing the uploaded ETL job using the test bucket. If ETL job testing tool 112A, 112B fails to validate the uploaded ETL job after the execution of the test data cases, ETL job testing tool 112A, 112B may determine that a stage within the uploaded ETL job has failed and proceed with creating test joblets in order to test each stage. Test joblets may be created for each stage of the ETL job, such as sequential file 1 402, filter 404, sequential file 2 406, sequential file 3 408, and sequential file 4 410, using a TestData stage. Next, ETL job testing tool 112A, 112B may execute the test data cases against each test joblet from the latest release of the uploaded ETL job and a previous release of the uploaded ETL job. ETL job testing tool 112A, 112B may then analyze the output of the test data cases to determine whether each test joblet returned the same output data for each release of the ETL job. If the output data from each release of the ETL job is the same, then ETL job testing tool 112A, 112B may determine that the stage corresponding to the test joblet is valid and operating correctly. If the output data from each release of the ETL job is not the same, then ETL job testing tool 112A, 112B may determine that the stage corresponding to the test joblet is not valid and not operating correctly. ETL job testing tool 112A, 112B may create a report that includes the test case results for each test joblet so a user may review the functionality of each stage of the uploaded ETL job.

Figure 5:
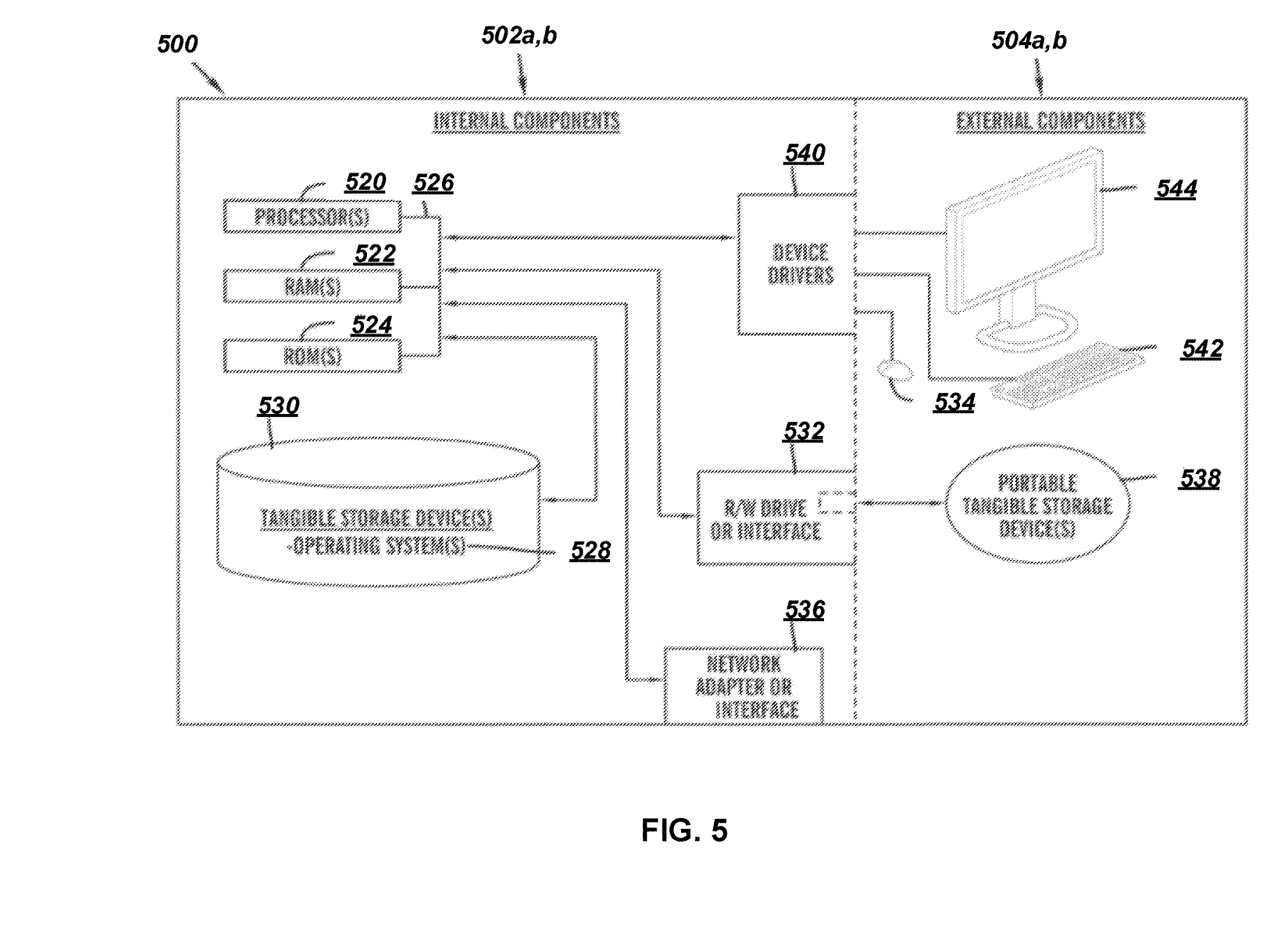
FIG. 5 depicts a cloud computing node according to an embodiment of the present invention.

FIG. 5 is a block diagram 500 of internal and external components of computer 110 and server 120 depicted in FIG. 1 in accordance with an embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 502, 504 is representative of any electronic device capable of executing machine-readable program instructions. Data processing system 502, 504 may be representative of a smart phone, a computer system, PDA, or other electronic devices. Examples of computing systems, environments, and/or configurations that may be represented by data processing system 502, 504 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 110 and network server 120 may include respective sets of internal components 502a,b and external components 504a,b illustrated in FIG. 5. Each of the sets of internal components 502 include one or more processors 520, one or more computer-readable RAMs 522 and one or more computer-readable ROMs 524 on one or more buses 526, and one or more operating systems 528 and one or more computer-readable tangible storage devices 530. The one or more operating systems 528, ETL job testing tool 112A, and repository 114A in client computer 110; and ETL job testing tool 112B and repository 114B in network server 120 are stored on one or more of the respective computer-readable tangible storage devices 530 for execution by one or more of the respective processors 520 via one or more of the respective RAMs 522 (which typically include cache memory). In the embodiment illustrated in FIG. 5, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, such as ETL job testing tool 112A, 112B and repository 114A, 114B can be stored on one or more of the respective portable computer-readable tangible storage devices 538, read via the respective R/W drive or interface 532 and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. ETL job testing tool 112A, and repository 114A in client computer 110 and ETL job testing tool 112B and repository 114B in network server 120 can be downloaded to client computer 110 and network server 120 from an external computer via a network (for example, the Internet, a local area network or other, wide area network) and respective network adapters or interfaces 536. From the network adapters or interfaces 536, ETL job testing tool 112A and repository 114A in client computer 110 and ETL job testing tool 112B and repository 114B in network server 120 are loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532 and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
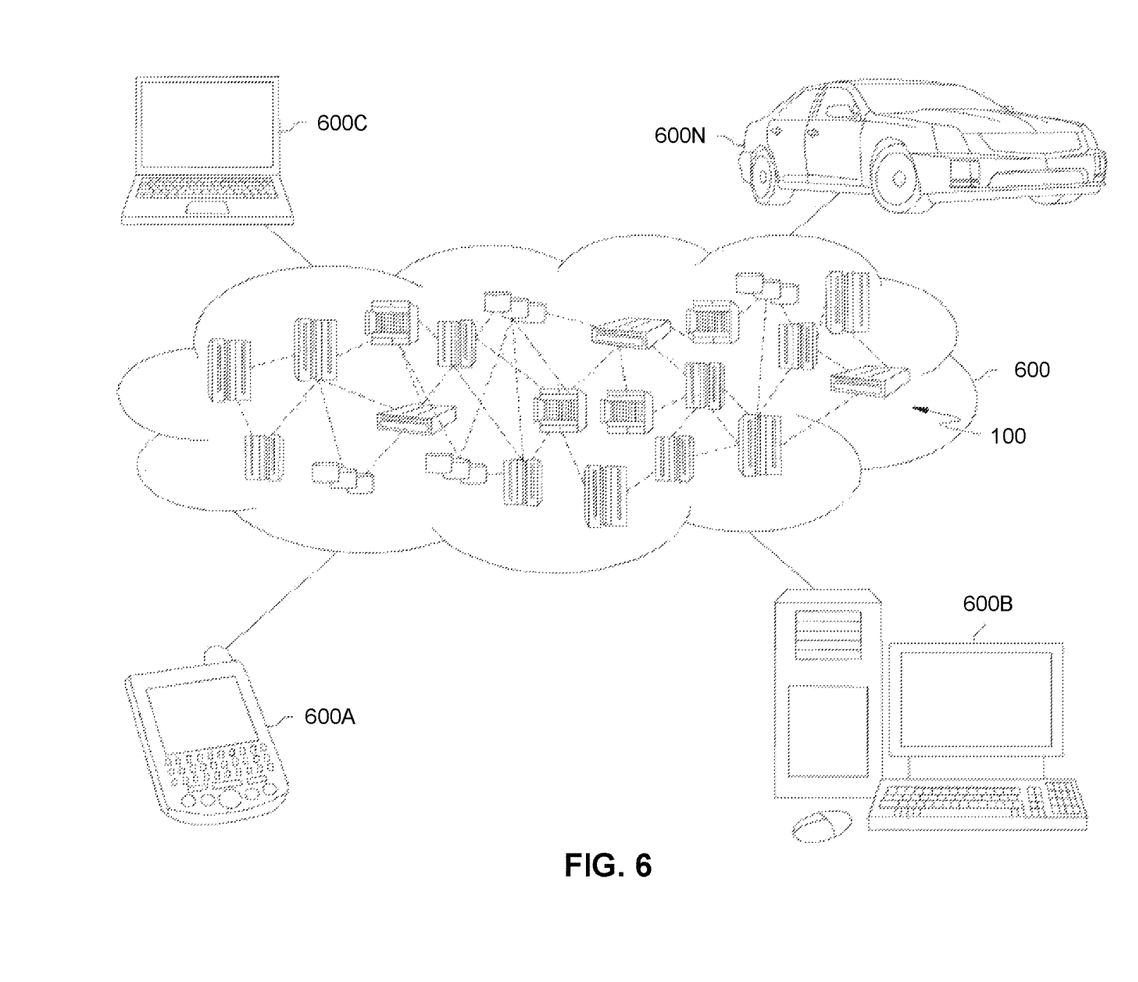
FIG. 6 depicts a cloud computing environment according to an embodiment of the present invention.

Referring now to FIG. 6, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 600N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that computing nodes 100 and cloud computing environment 600 can communicate with any type of computerized device over any type of network and/or network addressable connection (e.g., using a web browser).

Figure 7:
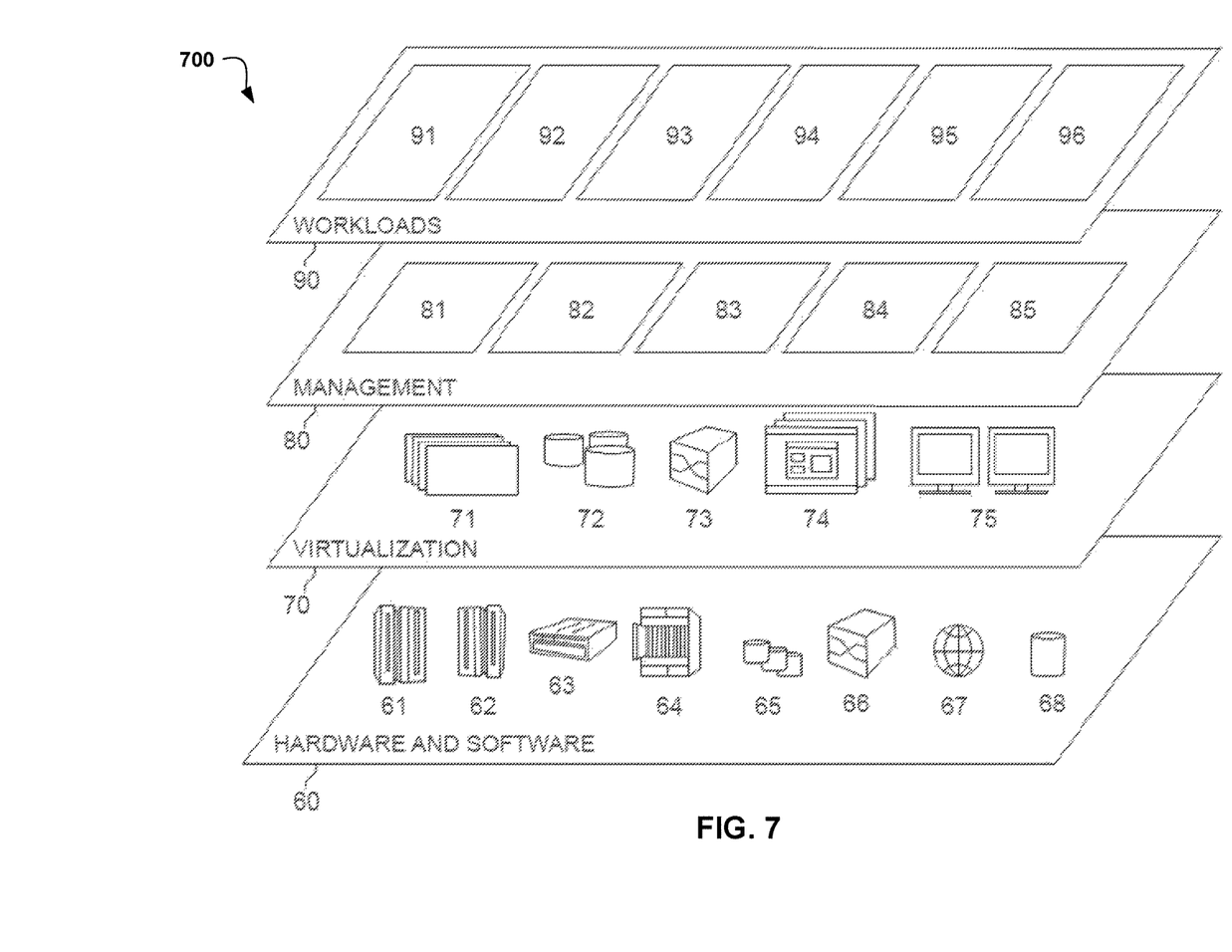
FIG. 7 depicts abstraction model layers according to an embodiment of the present invention.

Referring now to FIG. 7, a set of functional abstraction layers 700 provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and ETL job testing at the stage level 96. ETL job testing at the stage level may be implemented by dividing an ETL job into joblets and testing the functionality of each joblet to locate an error causing issue within the ETL job.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for testing an extract, transform, load job (ETL job), the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
executing a functionality test on an ETL job using a test bucket;
determining the executed functionality test produces a failure result;
creating at least one test sub-job corresponding to at least one stage within on the uploaded ETL job;
executing the at least one created test sub-job using a plurality of test data for each created test sub-job; and
creating a report based on a plurality of results associated with the at least one executed test sub-job.

2. The computer system of claim 1, wherein the test bucket includes a plurality of test data cases corresponding to a plurality of feature changes within the uploaded ETL job.

3. The computer system of claim 1, wherein the at least one test sub job is created for each stage within each at least one uploaded ETL job by an ETL test stage capable of processing the plurality of test data from a repository.

4. The computer system of claim 1, wherein generating the plurality of test data for each created test sub job is based on at least one of each stage type within each at least one uploaded ETL job and each stage schema within each at least one uploaded ETL job.

5. The computer system of claim 1, wherein creating the at least one test sub job includes at least one of storing the at least one created test sub-job in a test repository, integrating a functionality test into a user interface associated with an ETL tool, creating the at least one test sub-job automatically when the ETL job is saved, updating the at least one sub-job automatically when the ETL job is changed or saved, creating the at least one test sub-job in an updated portion of the ETL job, updating the at least one test sub-job in the updated portion of the ETL job, and determining the updated portion of the ETL job through comparison of an existing ETL job design within a design repository and an updated job design associated with the uploaded ETL job.

6. The computer system of claim 1, wherein determining the executed functionality test produces a failure result includes analyzing a plurality of output data produced by the executed functionality test and determining the plurality of output data is the same for a latest release of the uploaded ETL job and a previous release of the uploaded ETL job.

7. The computer system of claim 1, wherein executing a functionality test of the uploaded ETL job using a test bucket includes at least one of executing a latest release functionality test of the uploaded ETL job using the test bucket and executing a previous release functionality test of the uploaded ETL job using the test bucket.

8. A computer program product for testing an extract, transform, load job (ETL job), the computer program product comprising:

one or more computer-readable tangible storage medium and program instructions stored on at least one of the one or more tangible storage medium, the program instructions executable by a processor capable of performing a method, the method comprising:

executing a functionality test on an ETL job using a test bucket;

determining the executed functionality test produces a failure result;

creating at least one test sub-job corresponding to at least one stage within on the uploaded ETL job;

executing the at least one created test sub-job using a plurality of test data for each created test sub-job; and creating a report based on a plurality of results associated with the at least one executed test sub-job.

9. The computer program product of claim 8, wherein the test bucket includes a plurality of test data cases corresponding to a plurality of feature changes within the uploaded ETL job.

10. The computer program product of claim 8, wherein the at least one test sub-job is created for each stage within each at least one uploaded ETL job by an ETL test stage capable of processing the plurality of test data from a repository.

11. The computer program product of claim 8, wherein generating the plurality of test data for each created test sub-job is based on at least one of each stage type within each at least one uploaded ETL job and each stage schema within each at least one uploaded ETL job.

12. The computer program product of claim 8, wherein creating the at least one test sub-job includes at least one of storing the at least one created test sub-job in a test repository, integrating a functionality test into a user interface associated with an ETL tool, creating the at least one test sub job automatically when the ETL job is saved, updating the at least one sub job automatically when the ETL job is changed or saved, creating the at least one test sub-job in an updated portion of the ETL job, updating the at least one test sub-job in the updated portion of the ETL job, and determining the updated portion of the ETL job through comparison of an existing ETL job design within a design repository and an updated job design associated with the uploaded ETL job.

13. The computer program product of claim 8, wherein determining the executed functionality test produces a failure result includes analyzing a plurality of output data produced by the executed functionality test and determining the plurality of output data is the same for a latest release of the uploaded ETL job and a previous release of the uploaded ETL job.

14. The computer program product of claim 8, wherein executing a functionality test of the uploaded ETL job using a test bucket includes at least one of executing a latest release functionality test of the uploaded ETL job using the test bucket and executing a previous release functionality test of the uploaded ETL job using the test bucket.

* * * * *